United States Patent [19]

Zeischegg et al.

[11] Patent Number: 4,663,884
[45] Date of Patent: May 12, 1987

[54] PLANTER, ESPECIALLY FOR HYDROCULTURE

[75] Inventors: Walter Zeischegg, Blumenscheinweg 10, 7900 Ulm/Donau, Fed. Rep. of Germany; Bernd Brüssing, Ulm-Lehr, Fed. Rep. of Germany

[73] Assignee: Walter Zeischegg, Ulm/Donau, Fed. Rep. of Germany

[21] Appl. No.: 831,468

[22] Filed: Feb. 19, 1986

Related U.S. Application Data

[63] Continuation of Ser. No. 546,487, Oct. 28, 1983.

[30] Foreign Application Priority Data

Oct. 30, 1982 [DE] Fed. Rep. of Germany ....... 3240269

[51] Int. Cl.$^4$ .............................................. A01G 31/00
[52] U.S. Cl. ......................................... 47/59; 47/48.5; 47/79
[58] Field of Search ...................... 47/59, 79, 48.5, 81, 47/82; 137/426

[56] References Cited

U.S. PATENT DOCUMENTS

| | | | |
|---|---|---|---|
| 2,698,163 | 12/1954 | Swenson | 137/426 |
| 3,222,819 | 12/1965 | Marcam | 47/81 |
| 3,534,498 | 10/1970 | Herrli | 47/81 |
| 3,555,729 | 1/1971 | Chute | 47/81 |
| 3,783,555 | 1/1974 | Peters | 47/79 |
| 3,988,857 | 11/1976 | Baumann | 47/59 |
| 4,083,147 | 4/1978 | Garrick | 47/80 |
| 4,106,235 | 8/1978 | Smith | 47/79 |

FOREIGN PATENT DOCUMENTS

| | | |
|---|---|---|
| 7037156 | 10/1970 | Fed. Rep. of Germany . |
| 7326196 | 7/1973 | Fed. Rep. of Germany . |
| 7439280 | 11/1974 | Fed. Rep. of Germany . |
| 7535997 | 11/1975 | Fed. Rep. of Germany . |
| 7711822 | 4/1977 | Fed. Rep. of Germany . |
| 2364868 | 5/1977 | Fed. Rep. of Germany . |
| 2554108 | 6/1977 | Fed. Rep. of Germany . |
| 3012874 | 11/1980 | Fed. Rep. of Germany . |
| 2509724 | 10/1981 | Fed. Rep. of Germany . |
| 3020915 | 12/1981 | Fed. Rep. of Germany ........ 47/71 |
| 3240269 | 5/1984 | Fed. Rep. of Germany . |
| 83441 | 3/1935 | Sweden ................................. 47/79 |
| 502756 | 3/1971 | Switzerland . |

*Primary Examiner*—Robert A. Hafer
*Assistant Examiner*—Bradley M. Lewis
*Attorney, Agent, or Firm*—Karl F. Ross; Herbert Dubno

[57] ABSTRACT

A planter has a reservoir for water which is connected with the space below the reservoir in the planter housing by a valve seat cooperating with a valve plate on a stem rising from the float vertically displaceable in the space below the reservoir. The stem extends through the reservoir and up through the planter wall to have an upper end whose position signals the liquid level in the planter. A clamp on a sleeve carrying the valve plate can be released to permit axial displacement of the stem relative to the sleeve and adjustment of the spacing of the float from the valve plate to vary the level maintained in the planter.

11 Claims, 6 Drawing Figures

PLANTER, ESPECIALLY FOR HYDROCULTURE

This is a continuation of co-pending application Ser. No. 546,487 filed on Oct. 28, 1983.

CROSS REFERENCE TO RELATED APPLICATION

This application is related to our copending application Ser. No. 461,507 filed Jan. 27, 1983.

FIELD OF THE INVENTION

Our present invention relates to a planter and especially to a planter for hydroculture having a root compartment and a supply vessel for a liquid nutrient-containing solution separated from the root compartment and communicating with the latter via a valve.

More particularly, this invention relates to the controlled feeding of water which can contain nutrients to the roots of a plant contained within the plant compartment of a planter from a water reservoir.

BACKGROUND OF THE INVENTION

In German Patent Publication (Open Application DE-25 54 108), a planter has been described in which a valve plate is carried by a lever arm articulated to a wall of the planter and having a free end provided with a float responsive to the liquid level in the root compartment of the planter.

With lowering of the liquid level in the root compartment, the float drops and lifts, via the lever arm, the valve plate from a valve seat so that liquid from the reservoir can flow into the root compartment and thus a substantially constant liquid level can be maintained therein.

This system has several difficulties. For example, for various types of plants, different liquid levels are required for maximum growth and it is frequently necessary to vary the liquid level in accordance with seasonal water requirements for the various plants. Adjustment for these conditions is not possible with the conventional device just described in a convenient and efficient manner. For example, if a variation is required in the liquid level for any reason, the planter must be disassembled and the float replaced by one of a different shape or type.

In a further embodiment of the system described in the German Patent Publication DE-OS 25 54 108, level control is provided, but here the level control requires an airtight sealed reservoir which is difficult and expensive to fabricate and which creates problems when the reservoir must be refilled.

In another German patent document (Printed Application) DE-AS 23 64 868, a planter has been described in which the root compartment is so provided that the maximum liquid level in the planter always lies below the root compartment and the liquid transport is effected by a tube extending through the root compartment and using capillarity and liquid conductivity characteristics of the tube. The refilling of the reservoir is effected through the interior of the tube which has an inner flange defining a valve seat for a float provided in the tube. The float acts as a check valve preventing overfilling of the planter. The float is also provided with a rod which can extend out of the upper end of this tube so that the change in liquid level in the planter can be monitored by watching the descent of this rod. In this construction as well, there is no way to conveniently vary the liquid level in the planter or in the root compartment and, indeed, in this system as well there is no way to maintain the planter liquid level substantially constant by automatic refilling from a reservoir.

OBJECTS OF THE INVENTION

It is the principal object of the present invention to provide a planter, especially for hydroculture, having a root compartment and a liquid reservoir in which the liquid level in the root compartment can be maintained substantially constant at a level which can be selected at will and which can be varied in a convenient and economical manner.

Another object of this invention is to provide a planter with the advantages specified in which the refilling of the liquid reservoir is simplified.

Still a further object of this invention is to provide a planter, especially for hydroculture, whereby the disadvantages and drawbacks of the earlier systems specified can be obviated.

SUMMARY OF THE INVENTION

These objects and others which will become apparent hereinafter are attained, in accordance with the present invention, in a planter especially for hydroculture which comprises a root compartment for the root development of a plant and, externally of this root compartment, a supply vessel or reservoir for the liquid. According to the invention, the planter is provided with a valve having a valve seat on the reservoir and a valve plate cooperating with the valve seat for controlling the flow of liquid from the reservoir to the root compartment, the valve plate being connected with a float. The float is responsive to the liquid level in the root compartment and, according to an essential feature of the invention is provided with a float spindle extending vertically upwardly through the valve opening in the valve seat in the reservoir and carrying the valve plate, the spindle, plate and float being provided with means enabling adjustment of the axial spacing of the valve plate from the float and for locking or retaining the valve plate and float in their adjusted relative positions.

The system of the invention thus has a considerable advantage over earlier systems because the desired filling level can be set by simply axially adjusting the position of the valve plate relative to the float. The liquid level can be changed by simply varying the relative axial positions of the float and the valve plate along the spindle.

In a preferred embodiment of the invention, the float spindle extends vertically out of the reservoir so as to enable it to be engaged by the hand of a user and to effect axial adjustment of the valve plate with respect to the float without having to remove the plants from the planter, without having to open the valve or without having to disassemble or even empty the reservoir.

In a preferred and best mode embodiment of the invention, the float spindle is surrounded by a spindle sleeve and the valve plate is affixed to or formed on the lower end of the spindle sleeve while the spindle sleeve is axially shiftable and lockable to the spindle. This simplifies the guidance of the valve plate on the float spindle and thereby eliminates binding.

The problem of sealing between the valve plate and the float spindle is also eliminated in this construction as long as the spindle sleeve is sufficiently long that at least its upper end projects out of the liquid level in the reservoir.

In a further preferred embodiment of the invention, the spindle sleeve at its end turned away from the valve plate, i.e. at its upper ends, has a clamping device by means of which the spindle can be locked to the sleeve. This permits the spacing between the float and the valve plate to be adjusted in a stepless manner with a corresponding stepless adjustment of the height of the liquid level in the planter. The adjustment is effected most simply when both the spindle and the sleeve project out of the reservoir and, moreover, the monitoring of the liquid level can be simplified when the spindle projects sufficiently above the planter that variations in its position may be noted by the user.

A viewing glass can enclose the projecting end of the spindle to prevent contamination of the spindle or the sleeve and to permit an effective display of the liquid level. The viewing glass may be a downwardly open, upwardly closed tube which can be readily removed from the planter to avoid access to the upper ends of the spindle and the sleeve for the adjustment and locking in the manner described.

We have also found it to be advantageous to surround the float with a sleeve-shaped portion of the reservoir wall which defines a float guide. This guide sleeve prevents binding of the float and also prevents contamination of the valve by dead plant parts, root pieces or the like in the event of backflow from the root compartment or by reason of any other migration of contaminants from the root compartment into the reservoir.

It has been found to be especially advantageous to provide the reservoir peripherally around the root compartment so that the reservoir can have a comparatively large volume without detrimentally affecting the desired size of the root compartment or its shape. It has been found to be advantageous, in this connection, to form the planter from upper and lower parts which have a dividing plane which is substantially horizontal at the level of the valve seat, the upper part having in the region of its upper edge or rim, a radially inwardly extending projection which can bear against an outwardly projecting upper rim of a pot forming the root compartment or received in the root compartment.

When the pot is thus separable from the remainder of the planter, the plant can be easily removed from the planter and, if desired, after removal of the upper part and removal of the float guide followed by removal of the float and the valve, full cleaning of the device can be effected.

The reservoir may be mounted in the planter on spacers above the lower portion of the planter, the spacers corresponding to the length of the float height and the float play excursion, thereby allowing the reservoir also to be removable.

It is also possible, however, to form the upper part of the planter in one piece with the pot-forming portion of the planter, i.e. the portion defining the root compartment.

It has also been found to be advantageous to provide the bottom of the planter, generally below the root compartment, so that it is planar or slightly bowed or convex upwardly toward the root compartment and so that a pocket is formed outwardly of this upwardly bowed platform. This allows reduction of the liquid level in the planter to a height in which the liquid lies below the platform which underlies the root compartment, the liquid level thereupon lying in this generally annular pocket. This construction is particularly advantageous for the cultivation of plants in soil culture which are not to have their roots immersed always in the liquid. In spite of this extremely low liquid level, the float can perform a level control function which regulates the watering of the cultivated plants

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 2:
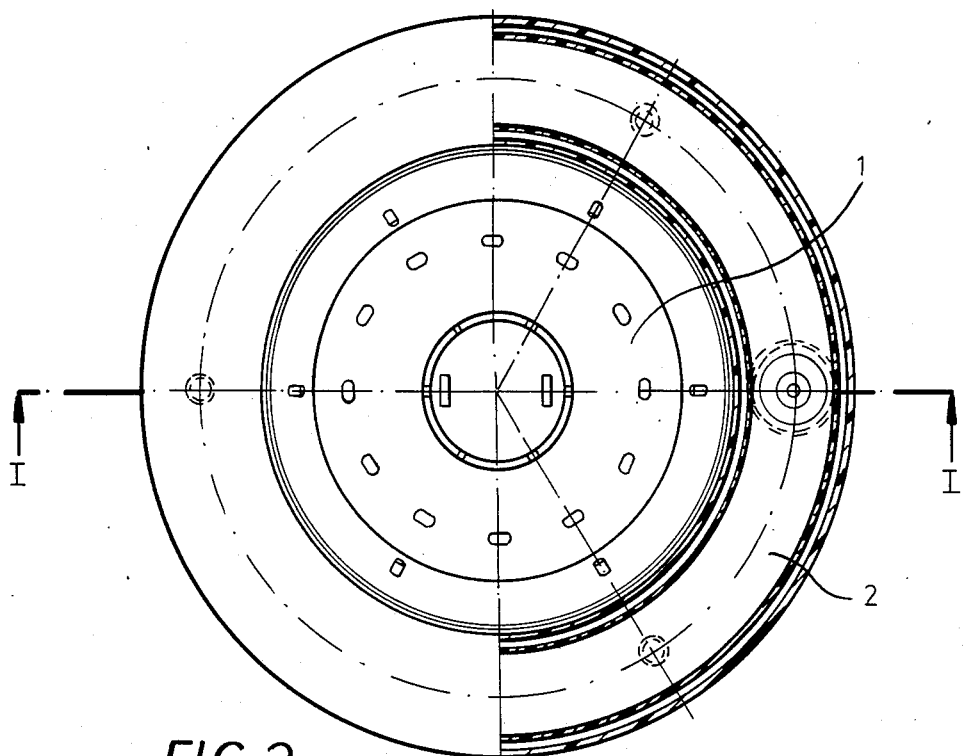
FIG. 2 is a view taken generally along the line II—II of FIG. 1 and thereby showing the planter in elevation in the left-hand side of this Figure and in section in the right-hand side of this Figure.
Figure 1:
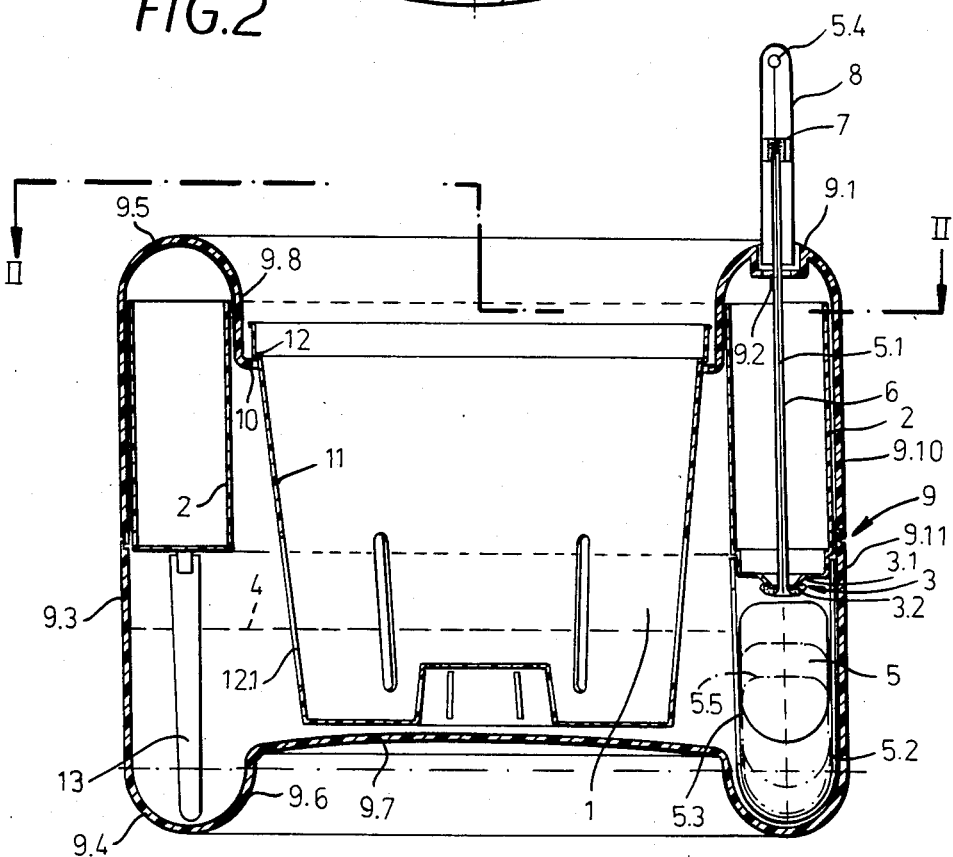
FIG. 1 is an axial cross section through a planter taken generally along the line I—I of FIG. 2.

The planter of the invention comprises a holder 9 as can be seen from FIGS. 1 and 2 internally of which is provided a pot which can define a root compartment 1 and externally of the latter but within the planter housing 9, a removable reservoir 2 is provided. The latter has the configuration of an upwardly open annular channel-cross section vessel and is provided at one point alongs its floor with a valve 3 which communicates between the bottom portion of the housing 9 and the interior of this reservoir to deliver water to the root compartment 1 which opens into the lower portion of the housing 9 via slits 12.1 formed in the wall of the root compartment.

The valve seat 3.1 is provided upon the reservoir 2 and cooperates with a valve plate 3.2 of the valve 3 which is opened and closed to maintain a constant liquid level as represented generally at 4. To this end, the valve plate 2 is coupled to a float 5 within the housing responsive to the liquid level to which the root compartment or planter is exposed. The float 5 is provided with an upwardly extending float spindle 5.1 in the form of a rod which extends axially through the valve opening in the valve surrounded by the valve seat 3.1, through the upwardly open reservoir 2 and, out of the latter, through a hole provided in the top of the housing 9 and surrounded by a well 9.1. The hole through which the stem or spindle passes is represented at 9.2 in FIG. 1.

The planter can have the shape generally illustrated in the aforementioned copending application, with the housing 9 having an outer cylindrical wall 9.3 terminating at the bottom in an inwardly rolled rim 9.4 and at the top with an inwardly rolled rim 9.5.

The upwardly extending portion 9.6 of the rim 9.4 is closed by a flat or upwardly domed, slightly convex wall 9.7. The downwardly extending portion 9.8 of the rim 9.5 terminates in an inward projection 10.

The float spindle 5.1 is axially shiftable relative to the valve plate 3.2 and can be locked with respect to the latter so that the spacing between the valve plate 3.2 and the float 5 can be adjusted.

To this end, the float spindle 5.1 is surrounded by a spindle sleeve 6, the lower end of which is formed integrally with the valve plate 3.2 or is connected to the latter.

The spindle sleeve 6 extends upwardly from the valve plate 3.2 through the valve opening and through the opening 9.2 and is axially shiftable relative to the float spindle 5.1.

Figure 4:
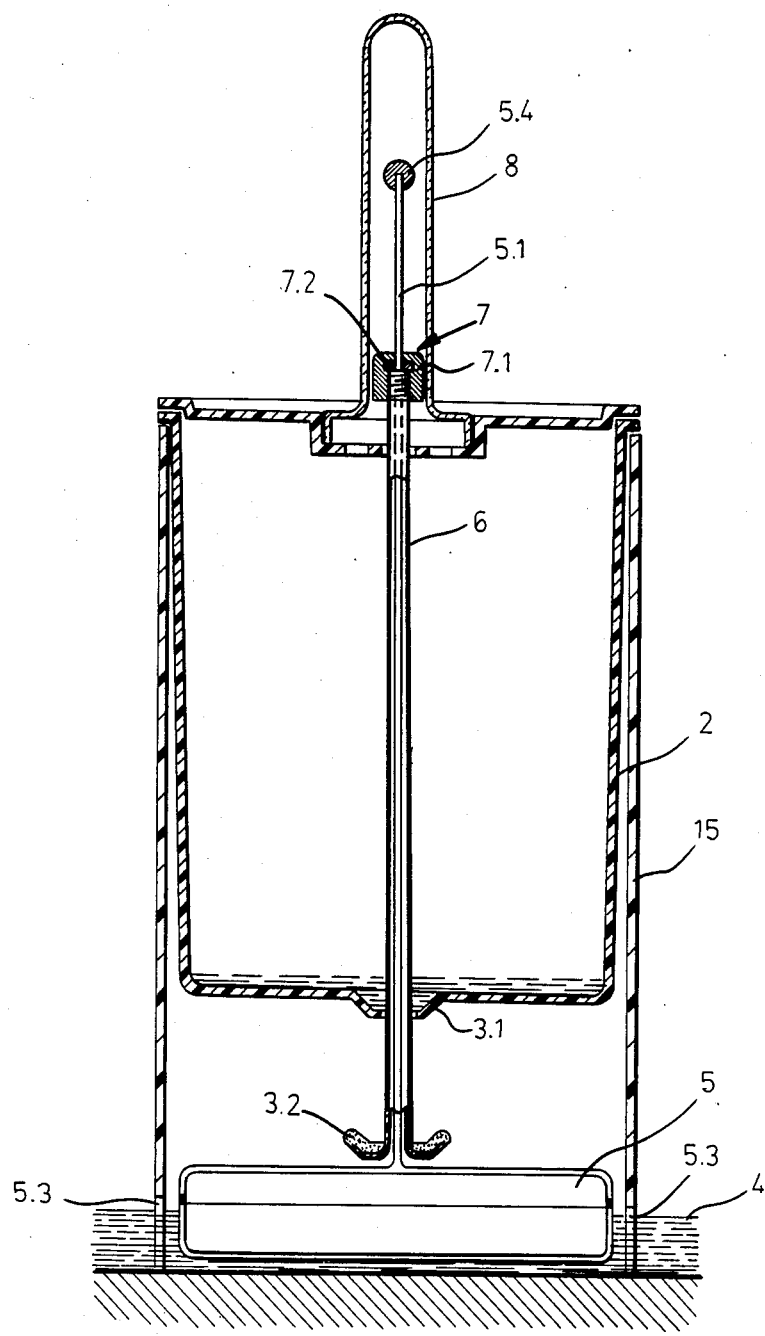
FIG. 4 is a view similar to FIG. 3 illustrating the structure thereof with the parts in a position corresponding to practically complete emptying of the reservoir.
Figure 5:
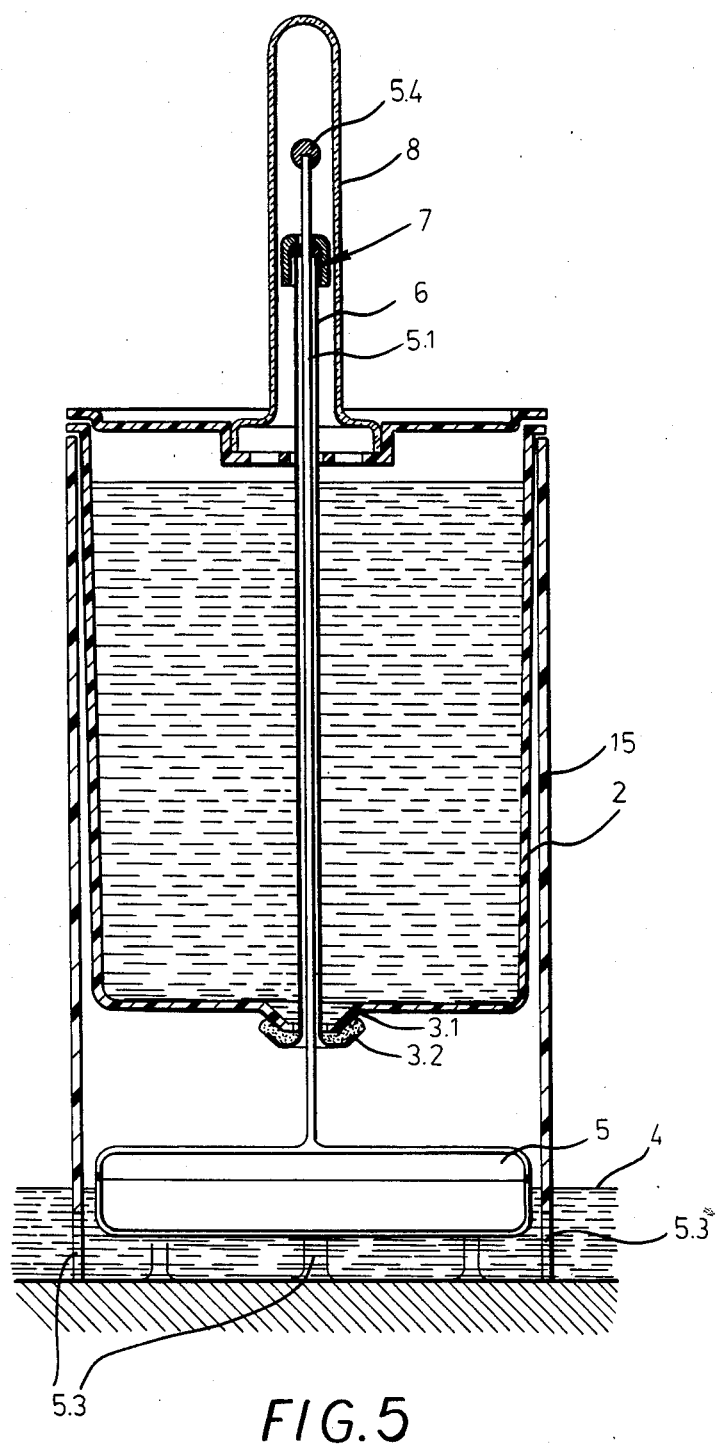
FIG. 5 is another view of this embodiment showing the settings of the parts for a reduced liquid level in the planter.
Figure 6:
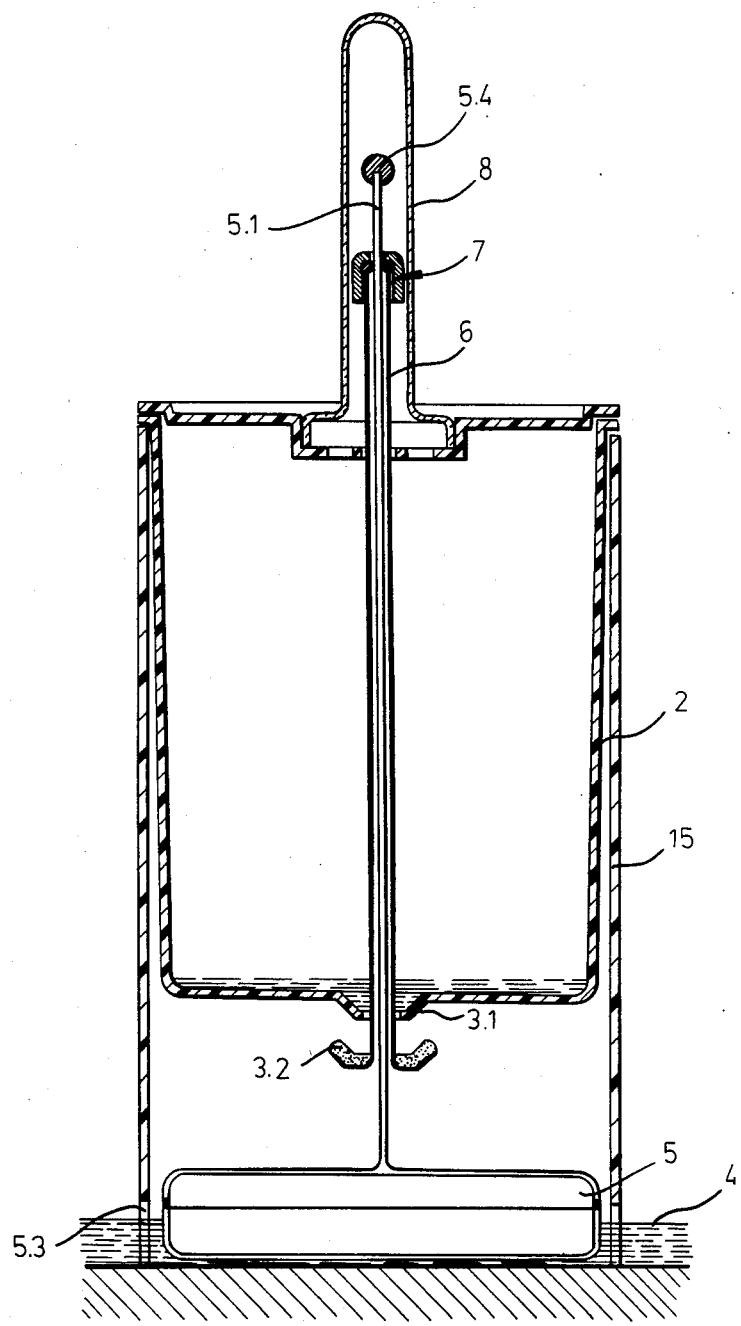
FIG. 6 is still another view similar to FIG. 3 showing the parts of this embodiment corresponding to the setting in FIG. 5 but for an empty or practically empty reservoir.

At its end turned away from the valve plate, i.e. at its upper end, the sleeve 6 is provided with a clamping device, illustrated in greater detail in FIGS. 4–6 and by means of which the float spindle 5.1 is clamped in the spindle sleeve 6.

The lengths of the spindle 5.1 and the sleeve 6 are so selected that they both project above the rim 9.5 of the planter and the upper end of the spindle and the sleeve can be protected by a viewing glass 8 which can have the configuration of a test tube which is inverted so that its mouth lies in the well 9.1 previously mentioned. Through the glass 8, the position of the knob 5.4 at the upper end of the float spindle can be readily ascertained to signal the level of the liquid in the planter.

The float 5 is also guided in a sleeve-shaped float guide 5.2 formed on or fixed to the reservoir 2 and provided with one or more openings 5.3 allowing liquid level equalization between the interior of this guide and the planter.

As long as there is water (which may or may not contain additional nutrients) in the reservoir 2 and the liquid in the housing 9 is at the level 4, the device is in a steady state. As liquid is drawn by the plants, and the level tends to drop below the level 4, the float will slightly open the valve 3 and additional liquid will enter until the level 4 is restored. The system thus operates in a steady state and the position of the upper end 5.4 of the stem will indicate this in the viewing glass 8.

Only when the reservoir 2 is empty will the float 5 cause the spindle and the spindle sleeve to sink to the point that the drop in the upper end of the spindle as detected in the viewing glass 8 is noticeable. At this point, the apparatus can be refilled. The refilling of the apparatus can be effected by a port in the housing 9 which can be closed or can remain open and through which water can be added to the reservoir 2.

If it is desired to shift the liquid level 4, the relative positions of the valve plate 3.2 and the float can be adjusted by loosening the clamp 7, relatively shifting the sleeve 6 and the stem 5.1, and retightening the clamp 7. The minimum liquid level has been represented by the lowermost dot-dash line which corresponds to the position 5.5 of the float. In this position, there is still some play for the float, enabling the valve 3 to open. The end 5.4 of the spindle 5.1 can barely project from the sleeve 6, thereby indicating that the device is set for minimum liquid level.

The ball-shaped knob 5.4 at the end of the float spindle 5.1 not only improves the visibility of this member but also forms an abutment beyond which the spindle cannot move past the clamping device 7. This abutment can establish the minimum liquid level in the manner described so that there is always some float play.

As is illustrated in the embodiment of FIGS. 1 and 2, the reservoir 2 can surround the root compartment 1 and in addition to the circular configuration of the planter shown, a rectangular, square or other shape can be provided for the housing 9 in plan view.

Advantageously, the housing 9 is subdivided into upper and lower parts substantially in the plane of the valve seat, the two parts being represented at 9.10 and 9.11, respectively. As illustrated, the upper part can fit into the lower part and thus can be removed therefrom.

The inward projection 10, previously mentioned, can engage below the rim 12 of a flower pot 11 forming the root compartment so that this flower pot can be readily extracted from the planter.

The projection 10 holds the pot above the platform 9.7.

Upon removal of the upper part 9.10 from the lower part 9.11, the reservoir 2 can also be removed and access afforded, after separation of the float guide 5.2, to the valve and the valve seat enabling cleaning of these parts.

The reservoir 2 rests upon spacers 13 which are angularly equispaced around the planter to support the reservoir in the lower part 9.11 of the housing. This spacer can have a height corresponding to the height of the float and the requisite float play or displacement.

In the embodiment shown in FIGS. 3–6, the reservoir 2 is formed as a self-standing independent insert for a planter and is received within a support 15, the lower end of which is formed with openings 5.3 communicating between the interior of the receptacle 15 and the planter surrounding this receptacle. Liquid level equalization is thus possible between the vessel 15 and the surrounding planter which can be provided with the root compartment in the manner previously described.

Figure 3:
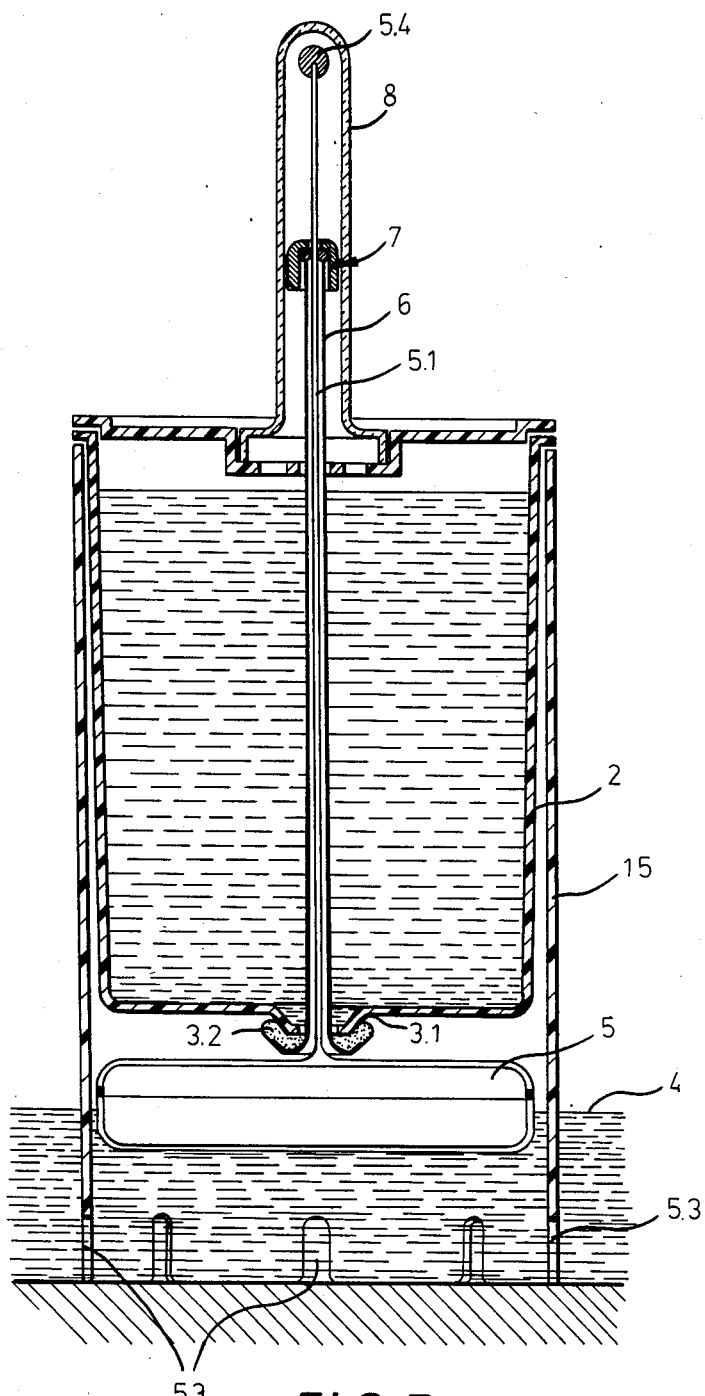
FIG. 3 is a fragmentary axial section showing the reservoir and valve arrangement of the present invention as a self-standing insert for a planter.

In FIGS. 3 and 4, a higher level of liquid is to be maintained in the planter and this higher level is represented in part by the greater projection of the upper end 5.4 of the float spindle from the sleeve 6. As the reservoir 2 empties, the clamping device and the end 5.4 sink together with the viewing glass as will be apparent from FIG. 4.

In this Figure it will also be evident that the clamping device 7 can comprise a sleeve 7.1 which can press a ring 7.2 against the spindle 5.1 as this sleeve is tightened on the threaded upper end of the sleeve 6.

In FIGS. 5 and 6, for the same embodiment, the desired liquid level in the planter is lower and this is manifested in a diminished distance between the free end or knob 5.4 of the spindle 5.1 and the clamping device 7. In the embodiment of FIGS. 3 and 4, of course, the valve plate and the float are closer together whereas they are further apart in the position shown in FIGS. 5 and 6. In the embodiment of FIGS. 3–6, moreover, the reservoir 2 can be seen to be cylindrical and received within the cylindrical support vessel 5 so that the entire assembly can be inserted in any conventional planter so as to maintain a given liquid level therein.

We claim:

1. A planter especially for hydroponics, the planter comprising:
    a housing adapted to receive a pot formed with a root compartment for a plant and having a space which communicates with the root compartment and capable of holding a body of liquid having a liquid level;
    means forming a reservoir for a liquid in the housing above the level;

means defining a downwardly open valve seat in the reservoir communicating between the interior of the reservoir and the space;

a buoyant float floating in the space on the liquid therein and displaceable thereby upward and downward in accordance with variations in the liquid level;

a spindle extending upward from the float through the seat, projecting above the reservoir and housing, and having an upper end visible above the planter;

a valve plate disposed on the spindle and displaceable relative to the spindle and to the float toward and away from the seat so as to admit liquid from the reservoir to the space when the valve plate descends;

an element substantially fixed to the valve plate, extending upward along the spindle from the valve plate, projecting above the reservoir, and having an upper end visible above the planter, and level-setting means above the planter for operatively and adjustably connecting the upper end of the element to the spindle at any of a plurality of vertically relatively offset positions for relatively fixing the valve plate and float and for varying the distance between the float and the valve plate to control and maintain substantially constant the liquid level in the space maintained by the valve and the valve plate, whereby the relative positions of the upper ends indicates above the planter the desired liquid level.

2. The hydroponic planter defined in claim 1 wherein the element is a sleeve coaxially surrounding the spindle and having a lower end carrying the valve plate.

3. The hydroponic planter defined in claim 2 wherein the level-setting means includes a clamp on the upper end of the sleeve.

4. The hydroponic planter defined in claim 2, further comprising
a viewing glass enclosing the upper ends of the sleeve and the spindle above the housing.

5. The hydroponic planter defined in claim 1, further comprising
a tubular float guide extending downward from the reservoir, the spindle being vertically slidable in the guide.

6. The hydroponic planter defined in claim 2 wherein the reservoir surrounds the root compartment.

7. The hydroponic planter defined in claim 1 wherein the housing has a pair of parts releasably jointed together at a horizontal plane level with the valve seat.

8. The hydroponic planter defined in claim 7 wherein the housing has an upper portion formed with an inward projection, the planter further comprising
a pot defining the root compartment and having an upper rim resting on the inward projection.

9. The hydroponic planter defined in claim 1 wherein the housing has a lower portion provided with upright spacers supporting the reservoir.

10. The hydroponic planter defined in claim 1 wherein the housing has a bottom below the root compartment and formed with a pocket into which the float can sink.

11. The hydroponic planter defined in claim 10 wherein the pocket is annular and extends around the periphery of the planter.

* * * * *